(12) United States Patent
Burmaster et al.

(10) Patent No.: US 6,776,974 B1
(45) Date of Patent: Aug. 17, 2004

(54) PROCESS FOR THE PRODUCTION OF SULFUR

(75) Inventors: Brian M. Burmaster, Chesterfield, MO (US); B. Gene Goar, Tyler, TX (US)

(73) Assignee: Monsanto Enviro-Chem Systems, Inc., St. Louis, MO (US)

(*) Notice: Subject to any disclaimer, the term of this patent is extended or adjusted under 35 U.S.C. 154(b) by 180 days.

(21) Appl. No.: 09/693,418

(22) Filed: Oct. 20, 2000

Related U.S. Application Data (60) Provisional application No. 60/160,974, filed on Oct. 22, 1999.

(51) Int. Cl.[7] .............................................. C01B 17/04
(52) U.S. Cl. .................... 423/574.1; 423/222; 423/224; 423/576.8
(58) Field of Search .............................. 423/576.2, 576, 423/574.1, 542, 245.3, 245.1, 215.5, 242.1, 242.2, 242.3, 220, 245.2, 576.8, 222, 224

(56) References Cited

U.S. PATENT DOCUMENTS

| | | | |
|---|---|---|---|
| 2,067,311 A | 1/1937 | Baehr | |
| 3,752,877 A | 8/1973 | Beavon | 423/244 |
| 3,896,215 A | 7/1975 | Bratzler et al. | 423/573 |
| 4,088,743 A | 5/1978 | Hass et al. | 423/539 |
| 4,113,849 A | 9/1978 | Atwood | 423/574 R |
| 4,279,882 A | 7/1981 | Beavon | 423/574 R |
| 4,552,747 A | 11/1985 | Goar | 423/574 R |
| 4,576,814 A | 3/1986 | Hass et al. | 423/573 G |
| 4,632,818 A | 12/1986 | Chen et al. | 423/574 R |
| 4,632,819 A | 12/1986 | Fischer et al. | 423/574 R |
| 4,659,553 A | 4/1987 | Linde | 423/243 |
| 4,795,620 A | 1/1989 | Heisel et al. | 423/243 |
| 4,889,700 A | 12/1989 | Elgue et al. | 423/220 |
| 5,035,810 A | 7/1991 | Heisel et al. | 210/750 |
| 5,304,361 A | 4/1994 | Parisi | 423/220 |
| 5,439,664 A | 8/1995 | Heisel et al. | 423/567.1 |
| 5,556,606 A | 9/1996 | Khanmamedov | 423/228 |
| 5,628,977 A | 5/1997 | Heisel et al. | 423/573.1 |
| 5,820,837 A | 10/1998 | Marjanovich et al. | 423/220 |
| 5,851,265 A | 12/1998 | Burmaster et al. | |

FOREIGN PATENT DOCUMENTS

| | | |
|---|---|---|
| EP | 0 140 573 A2 * | 5/1985 |
| EP | 0 252 497 A2 * | 1/1988 |
| EP | 0 581 026 A1 | 2/1994 |
| WO | WO92/20431 | 11/1992 |

OTHER PUBLICATIONS

Perry et al. *Chemical Engineers' Handbook* 5th Ed., McGraw–Hill Book Co. USA, ISBN 0–07–049428–9, pp. 18–84 to 18–90, 1973.*

(List continued on next page.)

*Primary Examiner*—Wayne A. Langel
(74) *Attorney, Agent, or Firm*—Senniger Powers Leavitt and Roedel (57) ABSTRACT

A process is provided for producing elemental sulfur from hydrogen sulfide contained in an acid gas feed stream wherein hydrogen sulfide and sulfur dioxide are reacted in a catalytic only sulfur recovery unit comprising a single catalytic converter containing a Claus catalytic reaction zone. A sulfur dioxide-enriched gas recovered from tail gas treatment is recycled and introduced into the catalytic reaction zone as part of a feed gas mixture that also includes the acid gas feed stream. Temperatures within the catalytic reaction zone are effectively moderated by recycle of tail gas effluent to the converter so that high concentrations of hydrogen sulfide in the acid gas feed stream can be tolerated and improved process flexibility and capacity are realized. A pretreatment process including contacting the acid gas with an aqueous acid wash to reduce the concentration of unsaturated hydrocarbons in the acid gas and inhibit deactivation of the oxidation catalyst is also disclosed.

42 Claims, 1 Drawing Sheet

OTHER PUBLICATIONS

Segeler (editor) *Fuel Flue Glasses: The Application And Interpretation of Gas Analyses and Tests* published by American Gas Association, USA, pp. 17, 25 and 26, 1940.*

Kohl et al. Gas Purification (4th Ed.) Gulf Publishing Co. Houston TX USA, ISBN 0-87201-314-6 (1985), pp. 420 and 451-462.*

Lewis G. Harruff, "Saudi Arabian Experience with DGA Units and Related Sulfur Plants", Lab Research & Development Center, Saudi Arabian Oil Co. (Saudi Aramco), Dhahran, Saudi Arabia, *1998*, pp. 76-98.

Brian M. Burmaster, et al., "Claus Master™ An Integrated Claus Process with Sulfur Dioxide Recovery", presented at the Sulfur '97 Conference, Vienna, Austria, Nov., 1997, total number of pages 14.

Kenneth P. Goodboy, et al., "Sulfur and Carbon Deposition on Claus Catalysts Examined", *Oil and Gas Journal*, Nov. 4, 1985, total number of pages 7.

A. Johnson, et al., "Techniques Curb Catalyst Deactivation at Sulfur Plant", *Technology, Oil and Gas Journal*, Oct. 26, 1987, pp. 33-40.

Max Schmidt, "Fundamental Chemistry of Sulfur Dioxide Removal and Subsequent Recovery Via Aqueous Scrubbing", *Int. J. Sulfur Chem.*, (1972), pp. 11-19, Part B, vol. 7, No. 1.

C. Donald Swaim, JR., "The Shell Claus Offgas Treating (SCOT) Process", *Sulfur Removal and Recovery*, Jun. 6, 1974, pp. 111-119.

Partial International Search Report for International Application No. PCT/US 00/29022 filed Oct. 20, 2000.

International Search Report for International Application No. PCT/US 00/29022 filed Oct. 20, 2000.

* cited by examiner

FIG. 1

PROCESS FOR THE PRODUCTION OF SULFUR

This application claims the benefit of U.S. provisional application Serial No. 60/160,974, filed Oct. 22, 1999, the disclosure of which is expressly incorporated herein by reference.

FIELD OF THE INVENTION

The present invention relates to processes for the production of elemental sulfur from an acid gas containing hydrogen sulfide.

BACKGROUND OF THE INVENTION

Claus technology is widely used to recover sulfur from hydrogen sulfide-containing sour gas feed stocks such as off gases produced in natural gas processing and petroleum refining operations.

Typically, the sour gas feed stock is treated to concentrate the hydrogen sulfide content to about 20 mole percent or more in an acid gas feed stream that is then directed to the sulfur recovery unit. In a conventional Claus plant, part of the hydrogen sulfide content of the acid gas feed stream is combusted (i.e., oxidized to sulfur dioxide) in a reaction furnace supplied with air according to equation (1).

$$H_2S + 3/2 O_2 \Longrightarrow SO_2 + H_2O \qquad (1)$$

Due to the inert load of the combustion air, the volumetric flow to the reaction furnace could be twice that of the acid gas stream and the equipment of the sulfur recovery unit must be sized to accommodate the increased flow. The amount of oxygen introduced into the reaction furnace is carefully controlled in order to combust approximately one-third of the hydrogen sulfide content of the acid gas and provide a combustion gas containing one mole of sulfur dioxide for every two moles of hydrogen sulfide in accordance with the well-known Claus equation (2). Careful control of combustion gas stoichiometry maximizes conversion to sulfur.

$$2 H_2S + SO_2 \Longleftrightarrow 3/N\ S_N + 2 H_2O \qquad (2)$$

A part (e.g., 60–70%) of the hydrogen sulfide and sulfur dioxide content of the combustion gas reacts in the furnace under combustion conditions to form sulfur and water. The gas exiting the reaction furnace then enters a waste heat boiler where some of the energy from the exothermic oxidation of hydrogen sulfide is recovered. A sulfur condenser is placed following the waste heat boiler to remove sulfur produced in the reaction furnace and lower the dew point of the cooled process gas stream. This gas is then fed to a catalytic stage containing a Claus conversion catalyst (e.g., activated alumina, bauxite or titanium dioxide) for promoting the reaction between hydrogen sulfide and sulfur dioxide. Prior to entering the catalytic stage, the gas is typically reheated in order to ensure that sulfur does not condense and deactivate the catalyst. In the catalytic stage, the Claus reaction takes place again to form additional sulfur and water, this time at a temperature considerably lower than in the reaction furnace. Product sulfur is removed in a sulfur condenser downstream of the catalytic stage. Since the Claus reaction is equilibrium controlled and higher conversion is favored by lower temperatures, a plurality of reheater, catalytic stage and condenser combinations (typically three) are employed in series to improve the overall sulfur recovery.

The tail gas exiting the condenser following the last catalytic stage still contains appreciable concentrations of sulfur-bearing compounds including unreacted hydrogen sulfide and sulfur dioxide, carbon-sulfur species such as carbon disulfide and carbonyl sulfide formed when hydrocarbons are present in the acid gas as well as sulfur vapor. Thus, in order to comply with emission standards, it is necessary in most cases to treat the tail gas in some fashion to reduce the concentration of these sulfur species prior to discharging the tail gas to the atmosphere. A hydrogenation system with a reducing gas generator and catalytic bed containing a cobalt-molybdenum catalyst may be employed in tail gas treatment. The hydrogenation system reduces both sulfur dioxide and sulfur vapor to hydrogen sulfide while hydrolyzing carbon disulfide and carbonyl sulfide to hydrogen sulfide. The hydrogen sulfide stream is then concentrated, typically using an amine absorbent process, and then recycled to the inlet of the sulfur recovery unit.

Although conventional Claus installations have served the sulfur industry well for many years, such installations can be very costly, both in terms of the initial capital outlay and ongoing operating expense. With increasing sulfur content of crude oil and natural gas, both petroleum refiners and natural gas processors are pushed for acid gas processing capacity. As known reserves are depleted, the sulfur content of natural gas and crude oil is likely to continue to increase as less attractive reserves are exploited. At the same time, ever-tightening environmental regulations demand lower and lower sulfur emissions. These forces are causing an increasing interest in new approaches capable of achieving high sulfur recoveries and increased process capacity within capital and operating cost constraints.

Proposed solutions intended to decrease the size and increase the capacity of a Claus installation include combusting the tail gas to oxidize the sulfur species present to sulfur dioxide, recovering a concentrated stream of sulfur dioxide from the combusted tail gas and recycling the concentrated sulfur dioxide to a point upstream of the sulfur recovery unit. In this fashion, it is possible to substantially avoid the inert load accompanying air used to oxidize hydrogen sulfide to sulfur dioxide and thereby decrease the size of sulfur recovery process equipment and/or increase plant capacity. In such a system, the complexity and expense associated with precise, constant control of the ratio of hydrogen sulfide to sulfur dioxide to optimize the Claus reaction may be eliminated. Moreover, it has been suggested to replace the Claus reaction furnace and multiple catalytic stages with a single catalytic stage combined with a tail gas treatment system to recover and recycle a concentrated sulfur dioxide stream to the catalytic converter. Such a sulfur recovery unit is disclosed in U.S. Pat. No. 5,628,977 (Heisel et al.).

Recycle of sulfur dioxide from tail gas treatment to a catalytic only sulfur recovery unit has the potential to reduce capital requirements and increase process capacity. However, such potential has not been fully realized. The high temperatures accompanying operation of a catalytic converter in reacting concentrated streams (e.g., as high as 90 mole percent or more) of hydrogen sulfide and recycle sulfur dioxide would result in significant equipment corrosion problems, rapid loss of catalytic activity due to hydrothermal aging of the Claus conversion catalyst and reduced sulfur formation. Thus, in the above-referenced patent, Heisel et al. teach that an installation including a single catalytic stage and recycle of concentrated sulfur dioxide from tail gas treatment can be used to process "relatively cleaner" acid gas streams containing no more than 20 percent by volume hydrogen sulfide. This restriction places a considerable limitation on the flexibility and capacity of the system.

Furthermore, regardless of configuration, Claus installations are susceptible to catalyst fouling and deactivation resulting from hydrocarbons present in the acid gas feed stream. Even in a conventional Claus installation, hydrocarbons in the acid gas may not be burned in the reaction furnace and pass through to the downstream catalytic stages. Catalytic cracking of heavier hydrocarbons such as n-octane and aromatics can lead to soot (i.e., elemental carbon) deposits on the Claus conversion catalyst. Carbon-sulfur species can also lead to soot formation. The coked catalyst may exhibit reduced activity and increased pressure drop. Unsaturated hydrocarbons including linear and branched olefins (e.g., alkenes) and aromatics such as benzene, toluene, ethylbenzene and xylene, sometimes referred to as BTEX, are particularly troublesome since they may polymerize and form gummy deposits that ultimately block the pores of the catalyst. The concerns regarding catalyst fouling from hydrocarbons in the acid gas feed stream are especially present in a catalytic only sulfur recovery unit wherein the acid gas is not exposed to the combustion conditions of a reaction furnace. The cost associated with frequent catalyst replacement or regeneration can add significantly to the operating costs of a Claus installation.

An activated carbon system has been reported for use in removing aromatics and heavier hydrocarbons from acid gas streams fed to a Claus installation. L. G. Harruff et al., "Activated Carbon Passes Test for Acid Gas Cleanup", *Oil & Gas Journal,* Jun. 24, 1996, pp. 31–37. Similarly, hydrophobic polymeric resin systems can be used to remove unwanted hydrocarbons from the acid gas. However, both of these systems suffer from the fact that they remove hydrocarbons on the basis of vapor pressure rather than reactivity. Thus, lower molecular weight olefins such as ethylene or propylene would tend to pass through both processes virtually unchecked.

Therefore, a need remains for further improvements in existing Claus practices and solutions to problems faced by the sulfur industry.

SUMMARY OF THE INVENTION

Among the objects of the present invention, therefore, are the provision of an improved process for the production of sulfur from hydrogen sulfide contained in an acid gas feed stream by the Claus reaction; the provision of such a process including a catalytic only sulfur recovery unit coupled with recycle of sulfur dioxide-enriched gas from tail gas treatment capable of processing highly concentrated hydrogen sulfide-containing acid gas streams and providing improved process flexibility and capacity; the provision of such a process having a high sulfur recovery efficiency and low sulfur emissions; the provision of such a process that can be installed and operated at lower cost than conventional Claus installations having a reaction furnace followed by a plurality of catalytic stages and a tail gas treatment system; and the provision of an improved process for the production of sulfur from hydrogen sulfide including a catalytic stage wherein the problems caused by hydrocarbons in the hydrogen sulfide-containing acid gas are alleviated in a cost-effective manner.

Briefly, therefore, the present invention is directed to a process for the production of elemental sulfur from an acid gas feed stream containing hydrogen sulfide. A feed gas mixture comprising the acid gas feed stream and sulfur dioxide is contacted with a Claus conversion catalyst in a single Claus catalytic reaction zone at a temperature effective for the reaction between hydrogen sulfide and sulfur dioxide to form a product gas effluent comprising elemental sulfur and water. The product gas effluent is cooled to condense and separate elemental sulfur from the product gas effluent and form a tail gas effluent. A portion of the tail gas effluent is combusted with a source of oxygen in a combustion zone to oxidize sulfur species present in the tail gas effluent and form a combustion gas effluent comprising sulfur dioxide. The combustion gas effluent is contacted with a liquid absorbent for sulfur dioxide in a sulfur dioxide absorption zone to selectively transfer sulfur dioxide from the combustion gas effluent to the absorbent and produce an exhaust gas from which sulfur dioxide has been substantially removed and a sulfur dioxide-rich absorbent. Sulfur dioxide is then stripped from the rich absorbent in a sulfur dioxide stripping zone to produce a lean absorbent and a sulfur dioxide-enriched stripper gas. The lean absorbent is recycled to the sulfur dioxide absorption zone for further selective absorption of sulfur dioxide from the combustion gas effluent. The sulfur dioxide-enriched stripper gas is mixed with the acid gas feed stream and the remainder of the tail gas effluent to form the feed gas mixture introduced into the Claus catalytic reaction zone. The proportion of the tail gas effluent introduced into the Claus catalytic reaction zone as part of the feed gas mixture is sufficient to moderate the temperature within the Claus catalytic reaction zone.

The invention is further directed to a process for the production of elemental sulfur from an acid gas feed stream containing hydrogen sulfide and an unsaturated hydrocarbon component selected from the group consisting of linear olefins, branched olefins, aromatic hydrocarbons and mixtures thereof. Hydrogen sulfide from the acid gas feed stream is oxidized to elemental sulfur in a catalytic reaction zone containing an oxidation catalyst and supplied with an oxidant gas. In accordance with the present invention, the acid gas feed stream is pretreated upstream of the catalytic reaction zone to reduce the concentration of the unsaturated hydrocarbon component and thereby inhibit deactivation of the oxidation catalyst. The pretreatment of the acid gas feed stream comprises contacting at least a portion of the acid gas feed stream with an aqueous acid wash to react unsaturated hydrocarbons with the acid and form an addition reaction product. Thereafter, the addition reaction product is separated from the acid gas feed stream.

Other objects and features of this invention will be in part apparent and in part pointed out hereinafter.

DETAILED DESCRIPTION OF THE INVENTION

In one embodiment of the present invention a process is provided for producing elemental sulfur from hydrogen sulfide contained in an acid gas feed stream wherein hydrogen sulfide and sulfur dioxide are reacted in a catalytic only sulfur recovery unit (i.e., a unit without a Claus reaction furnace) comprising a single catalytic converter containing a Claus catalytic reaction zone. A sulfur dioxide-enriched gas recovered from tail gas treatment is recycled and introduced into the catalytic reaction zone as part of a feed gas mixture that also includes the acid gas feed stream. In contrast to previous teaching, temperatures within the catalytic reaction zone are effectively moderated so that high concentrations of hydrogen sulfide in the acid gas feed stream can be tolerated and improved process flexibility and capacity are realized. In accordance with another embodiment of the present invention, a process is provided wherein the deleterious effects of hydrocarbons in the acid gas are diminished. More specifically, acid gas containing unsaturated hydrocarbons that can polymerize and/or lead to coking and deactivation of the oxidation catalyst is pretreated upstream of the catalytic reaction zone to reduce the concentration of the unsaturated hydrocarbon component and inhibit deactivation of the catalyst. Also, the conditions within the catalytic reaction zone are controlled to inhibit coking of the catalyst and/or remove carbon deposits from coked catalyst. These features of the present invention are described in detail below.

Figure 1:
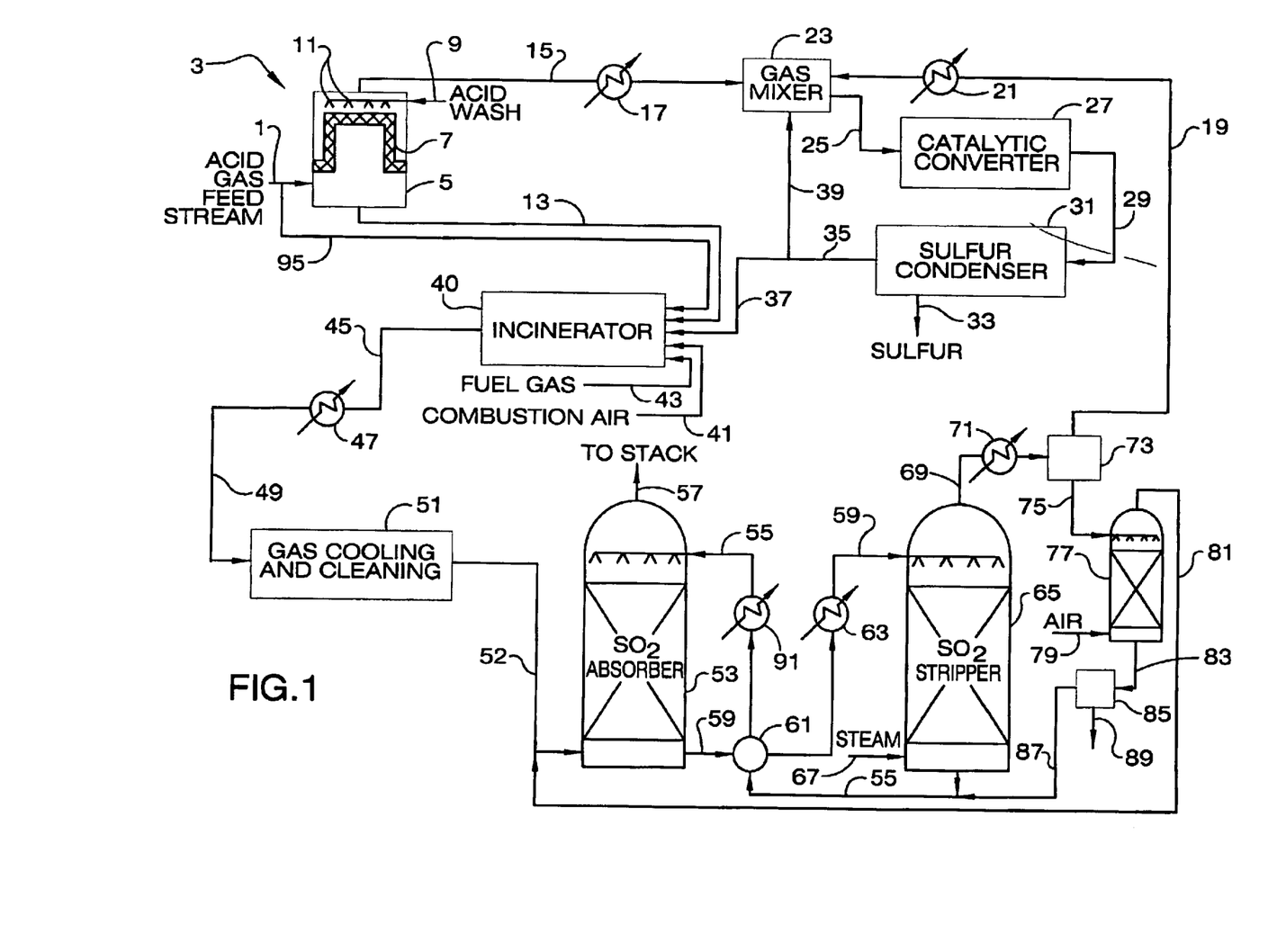
FIG. 1 is a schematic flow sheet illustrating one embodiment of the process of the invention for the production of elemental sulfur from an acid gas feed stream containing hydrogen sulfide.

FIG. 1 is a schematic flow sheet of an illustrative embodiment of the process of the present invention for the production of elemental sulfur from an acid gas containing hydrogen sulfide.

An acid gas feed stream 1 fed to the process is typically derived by concentrating the hydrogen sulfide content of a sour gas feed stock such as natural gas or an offgas from petroleum refining, gas liquefaction or rubber vulcanization operations. The hydrogen sulfide content of the sour gas feed stock is typically concentrated by contacting the feed stock with an amine absorbent to selectively transfer hydrogen sulfide from the feed stock to the absorbent and subsequently stripping hydrogen sulfide from the resulting hydrogen sulfide-rich absorbent to generate the acid gas feed stream. However, it should be understood that concentration of the hydrogen sulfide content of the sour gas feed stock, if employed, is not limited to amine absorption/stripping, but can include other chemical means, physical means, physical-chemical means as well as adsorption and other known techniques.

In addition to hydrogen sulfide, the acid gas feed stream 1 may contain other components such as carbon dioxide, water vapor and hydrocarbons in varying concentrations. However, the ability of the process disclosed herein to handle high concentrations of hydrogen sulfide in the incoming stream makes it particularly advantageous in processing acid gas feed streams containing at least about 30 mole percent hydrogen sulfide. More preferably, the hydrogen sulfide content of the acid gas feed stream is at least about 40 mole percent, at least about 50 mole percent and especially at least about 60 mole percent or even higher.

As shown in FIG. 1, at least a portion of the acid gas feed stream 1 is introduced into a pretreatment zone 3 on an as needed basis to reduce the concentration of unsaturated hydrocarbons contained within the acid gas feed stream and inhibit deactivation of the oxidation catalyst. The unsaturated hydrocarbon component of the feed stream may comprise linear or branched olefins (e.g., ethylene, propylene), aromatic hydrocarbons (e.g., benzene, toluene, ethylbenzene, xylene) and mixtures thereof. Among unsaturated hydrocarbons, toluene and xylene are believed to be particularly problematic in deactivating catalysts.

The pretreatment zone 3 is shown in FIG. 1 as comprising a vessel 5 having a gas-permeable mist elimination device 7 mounted therein. The entire vessel is heat traced to ensure minimal water condensation from the acid gas feed stream. An aqueous acid wash 9 is introduced into the vessel and distributed over the mist elimination device by spray nozzles 11. As the acid gas feed stream flows upwardly through the vessel and passes through the wetted mist elimination device, it contacts the aqueous acid wash. Unsaturated hydrocarbons react with the acid to form an addition reaction product having a vapor pressure considerably lower than the olefin and aromatic hydrocarbon reactants so that the reaction product may be readily separated from the acid gas feed stream in the mist elimination device. An organic waste stream 13 containing the acid addition reaction product drains from mist elimination device 7 and is removed from the bottom of vessel 5 while a pretreated acid gas feed stream 15 having a reduced concentration of unsaturated hydrocarbons exits the top.

Mist elimination device 7 mounted within vessel 5 may take various forms known in the art including a mesh pad, fiber bed mist eliminator or other impaction device. Although the pretreatment zone in FIG. 1 includes a mist elimination device wetted directly with a spray of the aqueous acid wash, one skilled in the art will appreciate that the pretreatment step may be carried out effectively using a variety of apparatus configurations. For example, the acid gas feed stream may be contacted directly with a spray of the aqueous acid wash or contacted in a gas-liquid contact device (e.g., packed tower or tray column) containing means for promoting mass transfer between the gas and liquid phases before passing through a downstream mist elimination device such as a centrifugal separator to separate the addition reaction product.

The aqueous acid wash may comprise various inorganic acids such as hydrobromic acid, hydrochloric acid, hydrofluoric acid, nitric acid, phosphoric acid and sulfuric acid. However, due to its reactivity with unsaturated hydrocarbons, low cost, ready availability and compatibility with the rest of the process, sulfuric acid is the most preferred acid for use in pretreatment of the acid gas feed stream. Sulfuric acid reacts with unsaturated hydrocarbons in the acid gas feed stream to form an addition reaction product comprising alkyl and/or aryl sulfates. Additionally, the sulfuric acid wash will also remove alcohols, phenols and bases such as amines or ammonia compounds from the acid gas feed stream.

The concentration of acid in the aqueous acid wash may vary considerably, it being understood that more dilute concentrations of acid may require an increased flow rate of wash for adequate pretreatment while higher acid concentrations may increase corrosion of process equipment and require more expensive materials of construction. An appropriate acid concentration can be readily determined and is selected in light of various considerations, including the volumetric flow rate of incoming acid gas, the type and concentration of unsaturated hydrocarbons in the acid gas and the gas-liquid contact apparatus employed in the pretreatment zone. The species and concentration levels of hydrocarbons contained in the acid gas will depend on the origin of the sour gas feed stock and the technique employed to concentrate the hydrogen sulfide content of the sour gas. In many instances, a significant portion of hydrocarbons present in the sour gas feed stock may be carried over to the acid gas feed stream along with hydrogen sulfide. Physical absorbents used in concentrating sour gas feed stocks are known to be particularly prone to hydrocarbon carryover. In the case of sulfuric acid used in the type of pretreatment apparatus shown in FIG. 1, an acid concentration in the wash of from about 1 percent to about 50 percent by weight is suitable for most applications.

Whether or not an acid gas feed stream should be pretreated in accordance with the present invention to reduce the concentration of unsaturated hydrocarbons is determined on a case-by-case basis depending upon the composition of the acid gas, the type of catalyst employed and its susceptibility to deactivation, the conditions prevailing in the downstream sulfur recovery unit and the relative costs associated with pretreatment and replacement or regeneration of prematurely deactivated catalyst. For a catalytic only sulfur recovery unit, pretreatment is generally desirable when the concentration of unsaturated hydrocarbons reaches about 200 ppmv. When employed, the pretreatment step is preferably carried out in a manner so that the concentration of the unsaturated hydrocarbon component in the pretreated gas is less than about 40 ppmv, more preferably less than about 30 ppmv and especially less than about 20 ppmv.

After pretreatment, acid gas feed stream 15 is heated against high pressure steam, hot oil or other heating fluid in an indirect heat exchanger 17. A recycle sulfur dioxide-enriched stripper gas 19 (the origins of which will be described below) is likewise heated to a similar temperature in indirect heat exchanger 21. The heated acid gas feed stream and recycle oxidant gas are combined in a static gas mixer 23 (e.g., a baffled conduit) to produce a feed gas mixture 25 comprising the acid gas feed stream and sulfur dioxide. The feed gas mixture is introduced into a catalytic converter 27 defining a single Claus catalytic reaction zone and contacts a Claus conversion catalyst disposed therein. Acid gas feed stream 15 and sulfur dioxide-enriched stripper gas 19 are heated in heat exchangers 17 and 21, respectively, such that feed gas mixture 25 entering catalytic converter 27 contacts the catalyst at a temperature effective for the Claus reaction between hydrogen sulfide and sulfur dioxide. The Claus conversion catalyst used in the catalytic reaction zone may comprise a conventional activated alumina or bauxite catalyst. Alternatively, an oxygen-resistant catalyst such as a titanium oxide catalyst may be employed. During normal operation, the molar ratio of hydrogen sulfide to sulfur dioxide in the feed gas mixture typically ranges from about 2:1 to about 5:1 and a per pass conversion efficiency of from about 50% to about 70% based on the hydrogen sulfide content of the feed gas mixture is attained in the catalytic converter.

A product gas effluent 29 comprising the reaction products and unreacted components of the feed gas mixture exits the converter and is cooled below the sulfur dew point in sulfur condenser 31 to condense and separate most of the elemental sulfur from the product gas effluent in sulfur stream 33 and form a tail gas effluent 35.

The heat generated by the exothermic reaction between hydrogen sulfide and sulfur dioxide adiabatically raises the temperature of product gas effluent 29 exiting catalytic converter 27. The temperature rise across the catalytic converter increases as the concentration of hydrogen sulfide in the incoming acid gas increases. At hydrogen sulfide concentrations below about 30 mole percent in the acid gas, the temperature rise across a properly operated converter is typically within acceptable limits. However, as the hydrogen sulfide content increases above this level, heat generated in the converter may begin to push the temperature within the catalytic reaction zone outside the desired operating range. As noted above, high temperature excursions in the catalytic reaction zone will greatly accelerate aging of the Claus conversion catalyst, lead to corrosion problems in process equipment and suppress sulfur formation in the equilibrium-controlled exothermic Claus reaction.

In accordance with the present invention, temperatures within the Claus catalytic reaction zone are moderated so that acid gas feed streams containing high concentrations (e.g., at least about 30 mole percent and up to about 90 mole percent or more) of hydrogen sulfide may be processed. Temperature moderation within the catalytic reaction zone is achieved by introducing a relatively cool diluent gas into the catalytic reaction zone. Preferably, the temperature of the diluent gas is below that of the product gas effluent exiting the converter and is essentially free of molecular oxygen. Oxygen can lead to sulfation of an activated alumina or bauxite catalyst and when this type of catalyst is used, the catalytic reaction zone should be maintained essentially free of oxygen. Even in the case of an oxygen-resistant catalyst, oxygen in the converter will induce much higher heats of reaction as a result of direct oxidation of hydrogen sulfide to sulfur. Preferably, as shown in FIG. 1, the flow of tail gas effluent 35 exiting sulfur condenser 31 is split, with a portion 37 being forwarded to tail gas treatment and the remainder 39 being recycled and used as the diluent gas introduced into the catalytic reaction zone for temperature control. Tail gas effluent remainder 39 is mixed with acid gas feed stream 15 and sulfur dioxide-enriched stripper gas 19 in gas mixer 23 to form feed gas mixture 25 introduced into converter 27. By using this process scheme, the only additional pieces of equipment are a recycle conduit for tail gas effluent and a recycle gas blower or other gas moving device (not shown) to overcome the pressure drop of the converter and sulfur condenser. Attention should be given to proper heat tracing of the recycle gas conduit and the recycle blower in order to ensure that the temperature of the tail gas effluent does not fall below the sulfur dew point and lead to sulfur condensation and solidification.

The proportion of the tail gas effluent introduced into the catalytic reaction zone as part of the feed gas mixture should be sufficient to moderate the temperature within the catalytic reaction zone and maintain the catalyst temperature within the desired operating range and inhibit premature hydrothermal aging of the catalyst. Gas and catalyst temperatures within the Claus catalytic reaction zone are controlled by adjusting the amount of tail gas effluent recycled to the catalytic converter. The amount of tail gas effluent recycled to the converter will depend upon and vary in direct proportion with the hydrogen sulfide content of the incoming acid gas. A simple feedback temperature control loop may be used for adjusting the amount of tail gas effluent recycled to the converter. The measured control temperature may be the temperature of the catalyst within the catalytic reaction zone or the temperature of the product gas effluent exiting the converter, the latter typically being somewhat lower than the former due to heat losses. In the case of an activated alumina catalyst, the catalyst temperature within the catalytic reaction zone is preferably maintained below about 480° C., more preferably from about 350° C. to about 400° C. For an oxygen-resistant catalyst such as a catalyst comprising a titanium dioxide-based catalyst, the catalyst temperature within the catalytic reaction zone is preferably maintained below about 600° C., more preferably from about 450° C. to about 500° C. Preferably, the gas temperature within the catalytic reaction zone is maintained from about 130° C. to about 400° C.

The portion of tail gas effluent 37 forwarded to tail gas treatment contains water vapor, trace amounts of sulfur, unreacted sulfur dioxide and hydrogen sulfide as well as other components of the incoming acid gas such as carbon dioxide and hydrocarbons. This gas is introduced into a combustion zone of an incinerator 40 along with an excess of combustion air 41 or other source of oxygen and supplemental fuel gas 43 as needed. In the combustion zone, sulfur species present in the tail gas effluent are oxidized to sulfur dioxide and any hydrocarbons present are oxidized to carbon dioxide and water in the excess air environment to form a combustion gas effluent 45 comprising sulfur dioxide. To moderate temperature, quenching water can be introduced into the incinerator. Alternatively, if the acid gas is pretreated to remove unsaturated hydrocarbons using an aqueous sulfuric acid wash as described above, the organic sulfate waste stream 13 can be fed into incinerator 40 to cool the incinerator by both evaporation of water and thermal decomposition of the sulfate waste into sulfur dioxide, oxygen and water. Other waste streams from the installation may also be fed to incinerator 40 and used for their combustible content including sour water stripper off-gas derived from petroleum cracking operations. This avoids problems associated with sending sour water stripper off-gas through the sulfur recovery unit such as plugging of heat exchanger equipment, catalyst fouling and corrosion of process equipment. Typically, this is a very troublesome stream to process in Claus installations since it contains ammonia in addition to hydrogen sulfide. Complete destruction of ammonia is required in a conventional Claus plant, since ammonia can form salts leading to plugging and corrosion of downstream process equipment. For complete destruction of ammonia and minimal formation of nitrogen oxides (NOx), high temperatures (e.g., in excess of 1200° C.) and reducing conditions are needed. Combustion air 41 may be supplied under pressure to incinerator 40 in two zones, one which is operated under reducing conditions and the following zone operated under oxidizing conditions.

Leaving incinerator 40, hot combustion gas effluent 45 is cooled in an indirect heat exchanger 47. Depending upon the size of the installation, heat exchanger 47 may take the form of a waste heat boiler or recuperator. Cooled combustion gas 49 is then delivered to a system for the selective removal and recovery of sulfur dioxide such as that described in U.S. Pat. No. 5,851,265 (Burmaster et al.), the entire disclosure of which is incorporated herein by reference. In such a system, the combustion gas effluent is introduced into a sulfur dioxide absorption zone and contacted with a liquid absorbent for selective absorption of sulfur dioxide to transfer sulfur dioxide from the combustion gas to the absorbent and produce an exhaust gas from which sulfur dioxide has been substantially removed and a sulfur dioxide-rich absorbent. Sulfur dioxide is stripped from the rich absorbent in a sulfur dioxide stripping zone to produce a lean absorbent and a sulfur dioxide-enriched stripper gas. The regenerated lean absorbent is recycled to the absorption zone for further selective absorption of sulfur dioxide from the combustion gas effluent. The system disclosed by Burmaster et al. is preferred in the practice of the present invention and for purposes of the following description, particular reference is made to the portion of that disclosure at col. 4, line 5 to col. 9, line 52 with any modifications or specific preferred features set forth below. However, it should be understood that various sulfur dioxide absorbents and sulfur dioxide recovery process schemes may be employed in the practice of the present invention.

Cooled combustion gas 49 from heat exchanger 47 is typically conditioned prior to entering the sulfur dioxide absorption zone. Conditioning of the combustion gas may include cleaning the gas to remove entrained impurities and sulfuric acid mist that may hinder downstream processing and further cooling the gas to a temperature more favorable for sulfur dioxide absorption. Removal of sulfuric acid mist is of particular importance in order to reduce corrosion of process equipment, increase sulfur dioxide solubility and decrease absorbent decomposition. Combustion gas conditioning in gas cooling and cleaning zone 51 may take various forms. For example, the combustion gas may be conditioned in one or more reverse jet scrubbers of the type sold by Monsanto Enviro-Chem Systems, Inc., Saint Louis, Mo. under the trademark "DYNAWAVE" or a similar gas scrubbing device and thereafter passing the gas through a fiber bed mist eliminator or electrostatic precipitator to remove sulfuric acid mist.

Conditioned combustion gas 52 exiting gas cooling and cleaning zone 51 is introduced at the bottom of a sulfur dioxide absorber 53 containing a sulfur dioxide absorption zone while liquid absorbent 55 is introduced at the top of the absorber. Absorber 53 may be a packed tower or other gas-liquid contact device containing means for promoting mass transfer between the gas and liquid phases. As the combustion gas passes upwardly through the absorber, it contacts a countercurrent flow of the liquid absorbent and sulfur dioxide is transferred from the combustion gas to the absorbent. An exhaust gas 57 from which sulfur dioxide has been substantially removed passes through a mist eliminator section at the top of the absorber to remove any entrained liquid before being discharged through a stack. Sulfur dioxide-rich absorbent 59 is withdrawn at the bottom of the absorber.

As noted above, various sulfur dioxide absorbents may be used in the practice of the present invention, including both chemical and physical absorbents. However, due to the fact that the process disclosed herein utilizes only a single Claus catalytic reaction zone, the sulfur dioxide partial pressure in the combustion gas is increased as compared to a conventional Claus plant. Typically, the combustion gas will contain at least about 5 mole percent or more sulfur dioxide. At these elevated concentrations, a chemical absorbent, such as an aqueous amine, may suffer from sulfur dioxide disproportionation, which leads to a proliferation of sulfur species (e.g., sulfites, bisulfites, sulfates, thiosulfates, pyrosulfites and thionates) in the sulfur dioxide-rich absorbent and difficulties in subsequent regeneration of the absorbent. Accordingly, the liquid absorbent contacted with the combustion gas is preferably a physical sulfur dioxide absorbent. A physical absorption-based sulfur dioxide recovery method is better suited for treatment of tail gas from a catalytic only sulfur recovery unit. With a physical sulfur dioxide absorbent, no chemical reaction occurs, such as disproportionation of sulfur dioxide. In fact, increasing the partial pressure of sulfur dioxide in the combustion gas actually enhances overall sulfur recovery efficiency when a physical absorbent system is employed.

Suitable physical sulfur dioxide absorbents for use in the practice of the present invention comprise at least one substantially water immiscible organic phosphonate diester of the formula wherein $R^1$, $R^2$ and $R^3$ are independently aryl or $C_1$ to $C_8$ alkyl and are selected such that the organic phosphonate diester has a vapor pressure less than about 1 Pa at 25° C. and the solubility of water in the organic phosphonate diester is less than about 10 weight percent at 25° C. In accordance with a more preferred embodiment, the organic phosphonate diester is a dialkyl alkyl phosphonate and $R^1$, $R^2$ and $R^3$ are independently $C_1$ to $C_6$ alkyl. In an especially preferred embodiment of the present invention, the liquid absorbent comprises dibutyl butyl phosphonate (DBBP). Organic phosphonate diesters of this type, their use as physical absorbents in sulfur dioxide recovery and the attendant benefits are set forth in U.S. Pat. No. 5,851,265 referred to above and incorporated herein.

An alternative physical sulfur dioxide absorbent is one comprising tetraethyleneglycol dimethylether such as is disclosed and utilized in the sulfur dioxide recovery processes described in U.S. Pat. No. 4,659,553 (Linde) and U.S. Pat. No. 4,795,553 (Heisel et al.), the entire disclosures of which are incorporated herein by reference. The liquid sulfur dioxide absorbent preferably contains more than 50% by weight tetraethyleneglycol dimethylether. Such a liquid sulfur dioxide absorbent suitably comprises, on a dry weight basis, from about 60% to about 80% tetraethyleneglycol dimethylether, from about 15% to about 25% triethyleneglycol dimethylether, from about 2.5% to about 7.5% pentaethyleneglycol dimethylether and from about 2.5% to about 7.5% mono ethers. Like the physical sulfur dioxide absorbent comprising an organic phosphonate diester, the circulating tetraethyleneglycol dimethylether-containing absorbent may contain water, for example, up to about 10% by weight. Use of sulfur dioxide absorbents based on tetraethyleneglycol dimethylether in the absorption and stripping stages of a sulfur dioxide recovery system, including the process equipment and operating conditions employed, is described in U.S. Pat. No. 4,659,553 (Linde) and U.S. Pat. No. 4,795,553 (Heisel et al.) and may be applied by one skilled in the art in the practice of the present invention.

Sulfur dioxide-rich absorbent 59 exiting the absorber is pumped through an absorbent heat interchanger 61 and a rich absorbent heater 63 and introduced near the top of a sulfur dioxide stripper 65. Absorbent heat interchanger 61 heats the rich absorbent 59 while cooling regenerated lean absorbent 55 passing from sulfur dioxide stripper 65 back to absorber 53. Rich absorbent heater 63 brings the rich absorbent to the desired stripping temperature. In the process illustrated in FIG. 1, steam 67 introduced near the bottom of stripper 65 is used as the stripping agent to strip sulfur dioxide from the rich absorbent. Although not shown in FIG. 1, a rebolier associated with stripper 65 could be used to provide a source of stripping steam. As rich absorbent passes down through the stripper it contacts a countercurrent flow of rising steam in a sulfur dioxide stripping zone and sulfur dioxide is transferred to the flow of steam. Like the sulfur dioxide absorber 53, stripper 65 may suitably comprise a packed tower or other gas-liquid contact device containing means for promoting mass transfer between the gas and liquid phases. A mixture of stripping steam and desorbed sulfur dioxide 69 exits the top of the stripper and is cooled in an overhead condenser 71 wherein most of the steam is condensed. The condensate and non-condensed gas are separated in gas-liquid separator 73 to form sulfur dioxide-enriched stripper gas 19 and condensate stream 75. The sulfur dioxide-enriched stripper gas preferably contains at least about 80 mole percent sulfur dioxide, more preferably at least about 90 mole percent sulfur dioxide, and is recycled to gas mixer 23. In order to improve the efficiency of stripper 65, a liquid ring vacuum pump or similar device could be employed to strip sulfur dioxide from the rich absorbent at reduced operating pressure. In such an embodiment, the operating pressure within the sulfur dioxide stripping zone is preferably maintained at from about 50 kPa to about 60 kPa absolute.

Condensate stream 75 comprised of mostly water and some absorbent is fed to a stripper 77 to remove residual sulfur dioxide. As shown in FIG. 1, air 79 is introduced near the bottom of stripper 77 and used to strip sulfur dioxide from the descending flow of condensate in countercurrent fashion. Stripper 77 may suitably be in the form of a packed tower or other gas-liquid contact device containing means for promoting mass transfer between the gas and liquid phases. Air stream 81 containing sulfur dioxide stripped from the condensate exits the top of stripper 77 and is recycled and combined with the conditioned combustion gas 52 entering sulfur dioxide absorber 53. Stripped condensate 83 exits the bottom of stripper 77 and may be further processed in condensate purifier 85 to separate and recover an absorbent stream 87 and purified water 89. Alternatively, although not shown in FIG. 1, the condensate stream 75 could be refluxed back to stripper 65. In such an embodiment, stripper 65 could contain an additional top section of packing material above which the refluxed condensate is introduced.

Lean absorbent 55 is withdrawn from the bottom of the stripper and recycled to sulfur dioxide absorber 53 along with recovered absorbent stream 87. Recycled absorbent is partially cooled in absorbent heat interchanger 61 and then further cooled in absorbent cooler 91 to a temperature favorable for sulfur dioxide absorption before being introduced into the sulfur dioxide absorber.

Various methods of stripping absorbed sulfur dioxide from the rich absorbent may be employed. For example, sulfur dioxide may be stripped using air or other non-condensable stripping gas as described in U.S. Pat. No. 5,851,265. However, in installations that employ an activated alumina or bauxite catalyst in the catalytic converter, the stripping technique should not introduce appreciable concentrations of oxygen into sulfur dioxide-enriched stripper gas 19 in order to avoid catalyst sulfation. In such applications, steam stripping is preferred.

Pretreatment of the acid gas by contact with an aqueous acid wash as described above effectively reduces the concentration of unsaturated hydrocarbons in the acid gas. However, saturated hydrocarbons (e.g., linear or branched alkanes) are not removed by this treatment and can pose problems with respect to soot formation in the catalytic reaction zone. This is especially true of heavier saturated hydrocarbons having at least four carbon atoms such as n-octane.

In accordance with the present invention, it has been determined that increasing the sulfur dioxide concentration relative to the molar amount of reduced carbon present in the Claus conversion catalyst will oxidize hydrocarbons completely to gaseous carbon dioxide, water and some carbon monoxide. In an accelerated rate calorimetry test over activated alumina catalyst, no soot formation was observed when the molar ratio of carbon to sulfur dioxide was maintained below 1 (e.g., 0.45).

In order to inhibit and/or remove elemental carbon deposits on the Claus conversion catalyst due to incomplete oxidation of saturated or unsaturated hydrocarbons present in the acid gas, a stoichiometric excess of sulfur dioxide over all reductant gases is maintained in the catalytic reaction zone. In addition to hydrogen sulfide, the primary reductant gases include hydrocarbons as well as carbon-sulfur compounds such as carbon disulfide and carbonyl sulfide. Preferably, this treatment is conducted while maintaining a temperature of at least about 300° C. in the Claus catalytic reaction zone. The temperature in the catalytic reaction zone may be increased as needed by reducing the amount of tail gas effluent recycled to the catalytic converter.

As shown in FIG. 1, the sulfur dioxide concentration in the Claus catalytic reaction zone may be increased by a bypass line 95 which bypasses at least a portion of the incoming acid gas feed stream 1 around catalytic converter 27 and introduces it directly into incinerator 40. Hydrogen sulfide in the acid gas is oxidized to sulfur dioxide in the incinerator and fed back to the Claus catalytic reaction zone as part of sulfur dioxide-enriched stripper gas 19.

This technique of removing soot deposits from the Claus conversion catalyst offers many advantages over previous approaches to catalyst regeneration. Conventionally, regeneration of coked catalyst in Claus installations has been accomplished by admitting a small amount of air into the catalytic converter at temperatures of approximately 500° C. Careful attention must be taken with air regeneration methods in order to ensure that the equipment is not damaged by exposure to high temperature or thermal stress. Likewise, the catalyst must be protected from possible irreversible sulfation or hydrothermal failure. Moreover, while the catalyst is regenerated, the catalytic converter must be taken out of service.

In contrast, the process of the present invention including sulfur dioxide recovery from tail gas treatment allows sulfur dioxide instead of oxygen to be used for oxidizing elemental carbon found in soot deposits. With sulfur dioxide as the main oxidant, carbonaceous compounds can be effectively oxidized at lower temperatures within the normal operating temperature of Claus conversion catalysts. Furthermore, problems with sulfation of the catalyst are avoided. Another additional benefit is that sulfur dioxide oxidation and catalyst regeneration can be achieved while the Claus catalytic converter remains in service.

Various modifications and adaptations of the processes disclosed above are possible. For example, gas streams may be heated by means other than indirect heat exchange with steam or other heating fluid such as by electrical resistance heaters or direct fired burners. Energy savings may be obtained by indirect heat exchange between process streams, such as by using the hot combustion gas effluent exiting the incinerator to heat the sulfur dioxide-enriched stripper gas and/or acid gas feed stream fed to the Claus catalytic converter and/or the combustion air fed to the incinerator. Furthermore, rather than using tail gas effluent as the diluent gas introduced into the catalytic converter to moderate the temperature within the catalytic reaction zone, steam or inert gases such as nitrogen, carbon dioxide and argon can be used. However, use of these alternatives is much less preferred in terms of operating costs. In addition, introducing steam into the catalytic reaction zone would suppress sulfur production in the Claus equilibrium-controlled reaction, leading to lower converter efficiencies.

Although the pretreatment process of the present invention for reducing the concentration of unsaturated hydrocarbons is described in connection with a catalytic only sulfur recovery unit having a single catalytic converter, it should be understood that the pretreatment step has general application in a variety of sulfur recovery unit configurations wherein hydrogen sulfide from the acid gas feed stream is oxidized to elemental sulfur over an oxidation catalyst in a catalytic reaction zone supplied with an oxidant gas. Thus, the pretreatment step may be employed upstream of the catalytic stage(s) of a conventional Claus installation including a reaction furnace wherein the oxidant gas supplied to the catalyst stage(s) includes sulfur dioxide produced in the furnace. Alternatively, the pretreatment step may be used upstream of a sulfur recovery unit including a selective oxidation zone of the type described in U.S. Pat. No. 4,279,882 (Beavon) wherein hydrogen sulfide in the acid gas stream is oxidized to sulfur using an oxidant gas such as air or other oxygen source.

The present invention is illustrated by the following examples which are merely for the purpose of illustration and not to be regarded as limiting the scope of the invention or manner in which it may be practiced.

EXAMPLE 1

Accelerated rate calorimetry testing of various hydrocarbons over an activated alumina catalyst saturated with sulfur dioxide was conducted to determine Claus catalyst fouling conditions that result in soot formation and catalyst deactivation. The molar ratio of carbon to sulfur dioxide was maintained at approximately 4.5 as shown in Table 1 below:

TABLE 1

| Hydrocarbon | Carbon/$SO_2$ Ratio | Alumina Fouling |
|---|---|---|
| Toluene | 4.74 | Polymerization |
| Benzene | 4.77 | None |
| Xylene | 4.29 | Soot Formation |
| n-Pentane | 4.29 | None |
| n-Octane | 4.36 | Soot Formation |
| n-Octane + Water Vapor | 4.51 | Soot Formation |

The most troublesome form of catalyst fouling is from polymerization of toluene. Unlike soot formation, which in most instances can be oxidized to carbon dioxide and water, polymerization of unsaturated hydrocarbons will ultimately block the pores of the Claus conversion catalyst. Toluene is believed to undergo complex reactions with sulfur to form diphenylethane and stilbene along with hydrogen sulfide according to reactions (3) and (4). Additionally, the product of these reactions, most notably stilbene, can enter into further reactions producing even higher aromatic polymers.

$$2C_6H_5CH_3 + S \Longrightarrow C_6H_5CH_2-CH_2C_6H_5 + H_2S \qquad (3)$$

$$2C_6H_5CH_3 + 2S \Longrightarrow C_6H_5CH=CHC_6H_5 + 2H_2S \qquad (4)$$

EXAMPLE 2

A computer model was used to assess the performance of a Claus installation in accordance with the present invention including a catalytic only sulfur recovery unit combined with tail gas treatment to recover and recycle a sulfur dioxide-enriched stream to the catalytic zone (See FIG. 1). The normalized flow rate, temperature and composition of the relevant gas streams are summarized below in Table 2. The reference numerals used below and in Table 2 correspond to those used in FIG. 1 and the preceding description.

The model was based on a hydrogen sulfide-enriched acid gas feed stream of the type produced in a petroleum refinery and use of DBBP as the sulfur dioxide absorbent with steam stripping of sulfur dioxide from the rich absorbent. Since the acid gas feed stream contained only light saturated hydrocarbons (methane and ethane), the pretreatment step described above was omitted. Furthermore, both methane and ethane do not react with sulfur dioxide in the catalytic zone at the operating temperatures employed, but pass through the converter to the incinerator where they are oxidized to carbon dioxide and water. Thus, these hydrocarbons do not contribute to soot formation and it was not necessary to bypass feed gas mixture to the incinerator to increase the concentration of sulfur dioxide in the catalytic reaction zone.

The acid gas feed stream 1 was heated to 177° C. using an electrical preheater. The heated acid gas feed stream was mixed with recycled sulfur dioxide-enriched stripper gas 19 that had been heated to a similar temperature and a portion of the tail gas effluent 39 to produce feed gas mixture 25 having a mixed gas temperature of 165° C. The feed gas mixture was introduced into the catalytic reaction zone of converter 27 containing an activated alumina catalyst to promote reaction between hydrogen sulfide and sulfur dioxide to produce sulfur and water. The exothermic reaction in the converter resulted in a significant temperature rise such that the product gas effluent 29 exiting the converter had a temperature of 372° C., well above the sulfur dew point of approximately 309° C. In accordance with the present invention, the temperature within the catalytic reaction zone was controlled by adjusting the flow rate of tail gas effluent 39 recycled to the converter.

The product gas effluent exiting the converter was cooled in sulfur condenser 31 to condense and separate sulfur 33 and produce low pressure steam. A mesh pad within the sulfur condenser ensured minimal sulfur entrainment in the tail gas effluent 35 exiting the condenser. The portion of the tail gas effluent 37 not recycled to the converter was introduced into tail gas incinerator 40 along with combustion air 41 and sour water stripper gas containing ammonia, water vapor and hydrogen sulfide. Sulfur species present in the gases fed to the incinerator were oxidized to sulfur dioxide and a minor amount to sulfur trioxide. With the combustible content of the tail gas effluent augmented by the sour water stripper gas, there was no need for supplemental fuel gas in the incinerator.

The combustion gas 45 exiting the tail gas incinerator was cooled and cleaned to produce the conditioned combustion gas 52. Sulfuric acid mist was removed from the combustion gas in a fiber bed mist eliminator or electrostatic precipitator. The conditioned combustion gas was fed to absorber 53 of the sulfur dioxide recovery system. The exhaust gas 57 exiting the absorber was heated prior to being fed to the stack for discharge to the atmosphere. Rich absorbent 59 from the absorber was heated prior to being introduced into sulfur dioxide stripper 65, wherein sulfur dioxide was stripped from the rich absorbent using steam. The mixture of stripping steam and desorbed sulfur dioxide 69 exiting the top of the stripper was cooled in condenser 71 to produce sulfur dioxide-enriched stripper gas 19 which was compressed and recycled via a rotary lobe compressor.

This example clearly illustrates use of tail gas recycle to the catalytic converter to moderate the temperature within the catalytic reaction zone.

In view of the above, it will be seen that the several objects of the invention are achieved.

As various changes could be made in the above-described processes without departing from the scope of the invention, it is intended that all matter contained in the above description be interpreted as illustrative and not in a limiting sense.

What is claimed is:

1. A process for the production of elemental sulfur from an acid gas feed stream containing hydrogen sulfide, the process comprising the steps of:

introducing a feed gas mixture comprising at least a portion of the acid gas feed stream and sulfur dioxide into a single Claus catalytic reaction zone;

contacting the feed gas mixture with a Claus conversion catalyst in the Claus catalytic reaction zone at a temperature effective for the reaction between hydrogen sulfide and sulfur dioxide to form a product gas effluent comprising elemental sulfur and water;

cooling the product gas effluent to condense and separate elemental sulfur from the product gas effluent and form a tail gas effluent;

combusting a portion of the tail gas effluent with a source of oxygen in a combustion zone to oxidize sulfur species present in the tail gas effluent and form a combustion gas effluent comprising sulfur dioxide;

contacting the combustion gas effluent with a liquid absorbent for sulfur dioxide in a sulfur dioxide absorption zone to selectively transfer sulfur dioxide from the combustion gas effluent to the absorbent and produce an exhaust gas from which sulfur dioxide has been substantially removed and a sulfur dioxide-rich absorbent;

stripping sulfur dioxide from the rich absorbent in a sulfur dioxide stripping zone to produce a lean absorbent and a sulfur dioxide-enriched stripper gas;

recycling the lean absorbent to the sulfur dioxide absorption zone for further selective absorption of sulfur dioxide from the combustion gas effluent; and mixing the sulfur dioxide-enriched stripper gas with at least a portion of the acid gas feed stream and the remainder of the tail gas effluent to form the feed gas mixture introduced into the Claus catalytic reaction zone, the proportion of the tail gas effluent introduced into the Claus catalytic reaction zone as part of the feed gas mixture being sufficient to moderate the temperature within the Claus catalytic reaction zone.

2. The process as set forth in claim 1 wherein the temperature of the Claus conversion catalyst within the Claus catalytic reaction zone is maintained sufficiently low to inhibit hydrothermal aging of the catalyst.

3. The process as set forth in claim 2 wherein the Claus conversion catalyst comprises an alumina catalyst, the Claus catalytic reaction zone is maintained essentially free of oxygen and the temperature of the catalyst within the Claus catalytic reaction zone is maintained below about 480° C.

4. The process as set forth in claim 3 wherein the temperature of the Claus conversion catalyst within the Claus catalytic reaction zone is maintained from about 350° C. to about 400° C.

5. The process as set forth in claim 2 wherein the Claus conversion catalyst comprises a titanium oxide catalyst and the temperature of the catalyst within the Claus catalytic reaction zone is maintained below about 600° C.

6. The process as set forth in claim 5 wherein the temperature of the Claus conversion catalyst within the Claus catalytic reaction zone is maintained from about 450° C. to about 500° C.

7. The process as set forth in claim 1 wherein gas temperature within the Claus catalytic reaction zone is maintained from about 130° C. to about 400° C.

8. The process as set forth in claim 1 wherein the acid gas feed stream contains at least about 30 mole percent hydrogen sulfide.

9. The process as set forth in claim 8 wherein the acid gas feed stream contains at least about 40 mole percent hydrogen sulfide.

10. The process as set forth in claim 9 wherein the acid gas feed stream contains at least about 50 mole percent hydrogen sulfide.

11. The process as set forth in claim 10 wherein the acid gas feed stream contains at least about 60 mole percent hydrogen sulfide.

12. The process as set forth in claim 8 wherein the acid gas feed stream is derived from a sour gas feed stock comprising hydrogen sulfide, the process further comprising:

contacting the sour gas feed stock with an absorbent for hydrogen sulfide to selectively transfer hydrogen sulfide from the sour gas feed stock to the absorbent and produce a hydrogen sulfide-rich absorbent; and stripping hydrogen sulfide from the hydrogen sulfide-rich absorbent to produce the acid gas feed stream.

13. The process as set forth in claim 12 wherein the sour gas feed stock is selected from the group consisting of natural gas and offgas from petroleum refining, gas liquefaction or rubber vulcanization operations.

14. The process as set forth in claim 1 wherein sulfur dioxide is stripped from the sulfur dioxide-rich absorbent by contacting the rich absorbent with steam in the sulfur dioxide stripping zone and the sulfur dioxide-enriched stripper gas contains at least about 80 mole percent sulfur dioxide.

15. The process as set forth in claim 14 wherein the sulfur dioxide-enriched stripper gas contains at least about 90 mole percent sulfur dioxide.

16. The process as set forth in claim 14 wherein the sulfur dioxide stripping zone is maintained at a pressure of from about 50 kPa to about 60 kPa absolute.

17. The process as set forth in claim 1 wherein the molar ratio of hydrogen sulfide to sulfur dioxide in the feed gas mixture is from about 2:1 to about 5:1.

18. The process as set forth in claim 1 wherein the Claus catalytic reaction zone is operated at a conversion efficiency of from about 50% to about 70% based on the hydrogen sulfide content of the feed gas mixture.

19. The process as set forth in claim 1 wherein the liquid absorbent for sulfur dioxide contacted with the combustion gas effluent in the sulfur dioxide absorption zone is a physical sulfur dioxide absorbent.

20. The process as set forth in claim 19 wherein the combustion gas effluent comprises at least about 5 mole percent sulfur dioxide.

21. The process as set forth in claim 19 wherein the liquid absorbent for sulfur dioxide comprises at least one substantially water immiscible organic phosphonate diester of the formula wherein $R^1$, $R^2$ and $R^3$ are independently aryl or $C_1$ to $C_8$ alkyl, the organic phosphonate diester having a vapor pressure less than about 1 Pa at 25° C. and the solubility of water in the organic phosphonate diester being less than about 10 weight percent at 25° C.

22. The process as set forth in claim 21 wherein the at least one organic phosphonate diester is a dialkyl alkyl phosphonate and $R^1$, $R^2$ and $R^3$ are independently $C_1$ to $C_6$ alkyl.

23. The process as set forth in claim 22 wherein the liquid absorbent for sulfur dioxide comprises dibutyl butyl phosphonate.

24. The process as set forth in claim 19 wherein the liquid absorbent for sulfur dioxide comprises tetraethyleneglycol dimethylether.

25. The process as set forth in claim 24 wherein the liquid absorbent for sulfur dioxide comprises more than 50% by weight tetraethyleneglycol dimethylether.

26. The process as set forth in claim 1 wherein the acid gas feed stream further comprises an unsaturated hydrocarbon component selected from the group consisting of linear olefins, branched olefins, aromatic hydrocarbons and mixtures thereof, the process further comprising pretreating the acid gas feed stream upstream of the Claus catalytic reaction zone to reduce the concentration of the unsaturated hydrocarbon component and inhibit deactivation of the Claus conversion catalyst, pretreatment of the acid gas feed stream comprising:

contacting at least a portion of the acid gas feed stream with an aqueous acid wash to react unsaturated hydrocarbons with the acid and form an addition reaction product; and separating the addition reaction product from the acid gas feed stream.

27. The process as set forth in claim 26 wherein the aqueous acid wash comprises sulfuric acid and the addition reaction product comprises a sulfate reaction product.

28. The process as set forth in 27 wherein the addition reaction product separated from the acid gas feed stream is introduced into the combustion zone.

29. The process as set forth in claim 26 wherein the acid gas feed stream further comprises a saturated hydrocarbon component, the process further comprising:

maintaining a stoichiometric excess of sulfur dioxide over reductant gases in the Claus catalytic reaction zone; and maintaining a temperature within the Claus catalytic reaction zone of at least about 300° C. to substantially completely oxidize saturated hydrocarbons present in the feed gas mixture and inhibit formation of soot deposits comprising elemental carbon on the Claus conversion catalyst.

30. The process as set forth in claim 29 wherein a portion of the acid gas feed stream is bypassed around the Claus catalytic reaction zone and introduced directly into the combustion zone to thereby increase the sulfur dioxide concentration in the Claus catalytic reaction zone.

31. The process as set forth in claim 1 wherein the acid gas feed stream further comprises a hydrocarbon component selected from unsaturated hydrocarbons, saturated hydrocarbons and mixtures thereof, the Claus conversion catalyst having soot comprising elemental carbon deposited thereon due to incomplete oxidation of hydrocarbons contained in the acid gas feed stream, the process further comprising:

removing soot deposited on the Claus conversion catalyst by maintaining a stoichiometric excess of sulfur dioxide over reductant gases in the Claus catalytic reaction zone and a temperature of at least about 300° C. within the Claus catalytic reaction zone for a time sufficient to oxidize elemental carbon present in the soot, the temperature within the Claus catalytic reaction zone being maintained at a temperature of at least about 300° C. by controlling the proportion of the tail gas effluent introduced into the Claus catalytic reaction zone as part of the feed gas mixture.

32. The process as set forth in claim 31 wherein at least a portion of the acid gas feed stream is bypassed around the Claus catalytic reaction zone and introduced directly into the combustion zone to thereby increase the sulfur dioxide concentration in the Claus catalytic reaction zone.

33. A process for the production of elemental sulfur from an acid gas feed stream containing hydrogen sulfide and an unsaturated hydrocarbon component selected from the group consisting of linear olefins, branched olefins, aromatic hydrocarbons and mixtures thereof, the process comprising oxidizing hydrogen sulfide from the acid gas feed stream to elemental sulfur in a catalytic reaction zone containing an oxidation catalyst and supplied with an oxidant gas, wherein the improvement comprises pretreating the acid gas feed stream upstream of the catalytic reaction zone to reduce the concentration of the unsaturated hydrocarbon component and inhibit deactivation of the oxidation catalyst, pretreatment of the acid gas feed stream comprising:

contacting at least a portion of the acid gas feed stream with an aqueous acid wash to react unsaturated hydrocarbons with the acid and form an addition reaction product; and separating the addition reaction product from the acid gas feed stream.

34. The process as set forth in claim 33 wherein the aqueous acid wash comprises sulfuric acid and the addition reaction product comprises a sulfate reaction product.

35. The process as set forth in claim 34 wherein the concentration of sulfuric acid in the aqueous acid wash is from about 1 percent to about 50 percent by weight.

36. The process as set forth in claim 33 wherein the concentration of the unsaturated hydrocarbon component in the acid gas feed stream is at least about 200 ppmv prior to pretreatment and is less than about 40 ppmv after pretreatment.

37. The process as set forth in claim 36 wherein the concentration of the unsaturated hydrocarbon component in the acid gas feed stream is less than about 30 ppmv after pretreatment.

38. The process as set forth in claim 37 wherein the concentration of the unsaturated hydrocarbon component in the acid gas feed stream is less than about 20 ppmv after pretreatment.

39. The process as set forth in claim 33 wherein the unsaturated hydrocarbon component of the acid gas feed stream comprises at least one compound selected from the group consisting of toluene and xylene.

40. The process as set forth in claim 33 wherein the acid gas feed stream is contacted with a spray of the aqueous acid wash and the acid gas feed stream is thereafter passed through a mist elimination device to separate the addition reaction product from the acid gas feed stream.

41. The process as set forth in claim 33 wherein the acid gas feed stream is contacted with the aqueous acid wash in a gas-liquid contact apparatus containing means for promoting mass transfer between the gas and liquid phases, the gas-liquid contact apparatus being selected from the group consisting of mist elimination devices, packed towers and tray columns.

42. The process as set forth in claim 41 wherein the acid gas feed stream is passed through a mist elimination device wetted with the aqueous acid wash whereby the acid gas feed stream is contacted with the aqueous acid wash and the addition reaction product is separated from the acid gas feed stream.

* * * * *